(12) United States Patent
Vasquez et al.

(10) Patent No.: US 8,306,213 B1
(45) Date of Patent: Nov. 6, 2012

(54) SKILL AND LEVEL ASSIGNMENT VIA CONCENTRIC INLAID CIRCLES

(75) Inventors: Juan Vasquez, San Jose, CA (US); Steve Osborn, Redwood City, CA (US); Ivo Daniel Carreira de Abreu, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/302,626

(22) Filed: Nov. 22, 2011

(51) Int. Cl.
*H04M 3/00* (2006.01)

(52) U.S. Cl. ......... 379/265.11; 379/265.12; 379/265.13; 379/266.01; 715/700

(58) Field of Classification Search .......... 379/265.11–265.13, 266.01, 266.02; 715/700, 762; 345/661
See application file for complete search history.

(56) References Cited

U.S. PATENT DOCUMENTS

| | | | |
|---|---|---|---|
| 5,832,059 A | 11/1998 | Aldred et al. | |
| 5,870,464 A * | 2/1999 | Brewster et al. | 379/219 |
| 5,903,641 A | 5/1999 | Tonisson | |
| 6,064,730 A | 5/2000 | Ginsberg | |
| 6,128,380 A | 10/2000 | Shaffer et al. | |
| 6,466,663 B1 | 10/2002 | Ravenscroft et al. | |
| 6,570,980 B1 | 5/2003 | Baruch | |
| 6,587,556 B1 | 7/2003 | Judkins et al. | |
| 6,661,889 B1 | 12/2003 | Flockhart et al. | |
| 6,704,410 B1 | 3/2004 | McFarlane et al. | |
| 6,771,765 B1 | 8/2004 | Crowther et al. | |
| 6,832,203 B1 * | 12/2004 | Villena et al. | 705/7.14 |
| 6,865,267 B2 | 3/2005 | Dezonno | |
| 7,027,586 B2 | 4/2006 | Bushey et al. | |
| 7,162,021 B1 | 1/2007 | Johnson et al. | |
| 7,599,861 B2 | 10/2009 | Peterson | |
| 7,783,030 B1 | 8/2010 | Bruening et al. | |
| 7,899,177 B1 | 3/2011 | Bruening et al. | |
| 7,903,800 B2 | 3/2011 | Kumhyr | |
| 7,916,858 B1 | 3/2011 | Heller et al. | |
| 8,005,204 B2 | 8/2011 | Bushey et al. | |
| 2003/0041314 A1 | 2/2003 | Heeren et al. | |
| 2006/0140357 A1 | 6/2006 | Gomez et al. | |
| 2007/0116240 A1 | 5/2007 | Foley et al. | |
| 2007/0201684 A1 | 8/2007 | Boghani | |
| 2008/0147470 A1 | 6/2008 | Johri et al. | |
| 2009/0228799 A1 * | 9/2009 | Verbeeck et al. | 715/727 |
| 2010/0111286 A1 | 5/2010 | Chishti | |
| 2010/0183138 A1 | 7/2010 | Spottiswoode et al. | |
| 2012/0005198 A1 * | 1/2012 | Pontier et al. | 707/723 |

* cited by examiner

*Primary Examiner* — Quynh Nguyen
*Assistant Examiner* — Oleg Asanbayev
(74) *Attorney, Agent, or Firm* — Pierce Atwood LLP

(57) ABSTRACT

Described are computer-based methods and apparatuses, including computer program products, for skill and level assignment. In some examples, the method includes providing for display of a graphical user interface (GUI) with one or more sets of graphical objects. Each set of graphical objects corresponds to a decision factor and each graphical object in each set of graphical objects corresponds to a level of the decision factor. The method further includes receiving an assignment configuration for a contact routing device. The assignment configuration is generated based on the one or more sets of graphical objects and associated one or more agents. The method further includes routing the contact to the selected one or more contact agents based on the assignment configuration.

19 Claims, 7 Drawing Sheets

SKILL AND LEVEL ASSIGNMENT VIA CONCENTRIC INLAID CIRCLES

TECHNICAL FIELD

The disclosure relates generally to contact center agent management systems.

BACKGROUND

Generally, contact center agent management systems depict agents and agent skills in a tabular or terminal form. These systems are generally designed for a particular contact center device (e.g., private branch exchange (PBX), email routing device). Any agent changes (e.g., new agent, new agent skill, revised agent skill) are generally sequentially made for every contact center device via the tabular or terminal form. This change process is time consuming and inefficient because the revisions can be required to occur weekly or even hourly and there may be hundreds, if not thousands, of contact center devices. Thus, a need exists in the art for improved agent assignment generation methods and systems.

SUMMARY

One approach is a method that configures a contact center agent management system. The method includes providing for display of a graphical user interface (GUI), the GUI including 1) one or more sets of graphical objects and 2) one or more agents of the contact center agent management system, wherein: a set of graphical objects corresponds to a decision factor utilized by the contact center agent management system in routing contacts; a graphical object in a set of graphical objects corresponds to a level of the decision factor; and the one or more agents are individuals to whom the contact center agent management system routes contacts; receiving, via the GUI, at least one association between an agent and a level of a decision factor of a graphical object; storing an assignment configuration for a contact routing device, the assignment configuration based on the at least one association; receiving, by the contact routing device, a contact; determining a contact decision factor and a contact level of the contact decision factor based on the contact; selecting one or more contact agents from the associated one or more agents based on the determined contact decision factor, the determined contact level of the contact decision factor, and the assignment configuration; and routing the contact to the selected one or more contact agents.

Another approach is a contact center agent management system. The system includes a display module, an agent association module, and an assignment configuration module. The display module is configured to display, via a display device, a graphical user interface (GUI) with one or more sets of graphical objects and one or more agents of the contact center agent management system, wherein: each set of graphical objects corresponding to a decision factor utilized by the contact center agent management system in routing contacts, each graphical object in each set of graphical objects corresponding to a level of the decision factor, and the one or more agents are individuals to whom the contact center agent management system routes contacts. The agent association module is configured to associate one or more agents with at least one set of graphical objects based on user input, the user input comprises, for each of the one or more agents, an agent decision factor and an agent level for the agent decision factor. The assignment configuration module is configured to generate an assignment configuration for a contact routing device based on the one or more sets of graphical objects and the associated one or more agents.

Another approach is a computer program product, tangibly embodied in an information carrier. The computer program product includes instructions being operable to cause a data processing apparatus to: display, via a display device, a graphical user interface (GUI) with one or more sets of graphical objects and one or more agents of the contact center agent management system, wherein: each set of graphical objects corresponding to a decision factor utilized by the contact center agent management system in routing contacts, each graphical object in each set of graphical objects corresponding to a level of the decision factor, and the one or more agents are individuals to whom the contact center agent management system routes contacts; associate one or more agents with at least one set of graphical objects based on user input, the user input comprises, for each of the one or more agents, an agent decision factor and an agent level for the agent decision factor; and generate an assignment configuration for a contact routing device based on the one or more sets of graphical objects and the associated one or more agents.

In some examples, any of the approaches above can include one or more of the following features.

In some examples, each decision factor is associated with an agent skill and each level of the decision factor is associated with an agent level of the agent skill.

In some examples, the agent level is a measure of an agent proficiency in the agent skill.

In some examples, the contact is an audio call, an e-mail message, a text message, or a video call.

In some examples, the method further includes generating an assignment list for each combination of decision factor and level associated with the one or more agents.

In some examples, the method further includes normalizing the assignment list based on configuration parameters associated with the contact routing device.

In some examples, the method further includes generating an assignment configuration for a contact routing device based on the one or more sets of graphical objects, the associated one or more agents, and the normalized assignment list.

In some examples, the method further includes determining if two or more of the sets of graphical objects overlap on the GUI; and modifying the assignment list based on the two or more of the sets of graphical objects and the determination of overlap.

In some examples, the method further includes associating one or more agents with at least one set of graphical objects based on user input, the user input comprises, for each of the one or more agents, an agent decision factor and an agent level for the agent decision factor.

In some examples, the method further includes generating a second assignment configuration for a second contact routing device based on the plurality of sets of graphical objects and the associated one or more agents.

In some examples, each set of graphical objects is a set of concentric inlaid circles.

In some examples, the method further includes revising associations of the one or more agents based on a second user input; and automatically updating the assignment configuration for the contact routing device based on the revised associations.

In some examples, the assignment configuration comprises a call routing script.

In some examples, the system includes the contact routing device. The contact routing device is configured to: receive a contact via the contact routing device; determine a contact decision factor and a contact level of the contact decision factor based on the contact; select one or more contact agents from the associated one or more agents based on the determined contact decision factor, the determined contact level of the contact decision factor, and the assignment configuration; and route the contact to the selected one or more contact agents.

In some examples, the system further includes an assignment list module configured to generate an assignment list for each combination of decision factor and level associated with the one or more agents.

In some examples, the system further includes a normalization module configured to normalize the assignment list based on configuration parameters associated with the contact routing device.

In some examples, the assignment configuration module is further configured to generate an assignment configuration for a contact routing device based on the one or more sets of graphical objects, the associated one or more agents, and the normalized assignment list.

In some examples, the system further includes a graphical object overlap module configured to: determine if two or more of the sets of graphical objects overlap on the GUI; and modify the assignment list based on the two or more of the sets of graphical objects and the determination of overlap.

In some examples, the assignment configuration module is further configured to generate a second assignment configuration for a second contact routing device based on the plurality of sets of graphical objects and the associated one or more agents.

In some examples, the system further includes an agent association module configured to: revise associations of the one or more agents based on a second user input; and automatically update the assignment configuration for the contact routing device based on the revised associations.

In some examples, the system further includes a communication module configured to communicate the assignment configuration to the contact routing device.

The agent assignment generation systems and methods described herein (hereinafter "technology") can provide one or more of the following advantages. An advantage of the technology is the graphical representation of the decision factors and levels, which enables fast and efficient association of agents, thereby decreasing the maintenance cost for a contact center. Another advantage of the technology is the generation of assignment configurations for a variety of contact routing devices (e.g., call routing device, email routing device, text message routing device), which increases the efficiency of the technology by being vendor agnostic. Another advantage of the technology is the automatic updating of the assignment configuration for a contact routing device based on revised associations of agents enables a fast and efficient mechanism for updating agent information (e.g., skill, skill level) across a plurality of contact center devices.

Other aspects and advantages of the present disclosure will become apparent from the following detailed description, taken in conjunction with the accompanying drawings, illustrating the principles of the disclosure by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The agent assignment generation method and apparatus includes technology that, generally, visualizes assignment of agents based on decision factors (e.g., skill, attribute, foreign language, technology, availability, negative skill) and levels of decision factors (e.g., expert, intermediate, beginner, time period, contact waiting time). The technology generates assignment configurations for contact routing devices (e.g., private branch exchange (PBX), voice over internet protocol (VoIP) routing device, email routing device) for utilization in routing contacts (e.g., call, email, instant messaging, multimedia) between users (e.g., customer, client, employee) and agents based on the decision factors and the levels of decision factors. For example, an incoming call from a Spanish-speaking customer for help configuring a cable modem is routed by a PBX to an agent with at least a beginner experience in cable modem configuration and at least an intermediate experience with Spanish. The routing of contacts based on the decision factor and the level of the decision factor as described herein advantageously provides a better customer experience, which decreases the cost per contact.

For example, in operation, a contact center manager utilizes a computing device with a graphical user interface (GUI) to visually assign agents to one or more graphical objects (e.g., circles, triangles, rectangles, squares). The one or more graphical objects are organized by sets (e.g., ten sets of graphical objects with four graphical objects in each set, three sets of graphical objects with two graphical objects in each set). Each set of graphical objects corresponds to a decision factor (e.g., type of technology, type of question in a voice response system). Each graphical object in a set of graphical objects corresponds to a level of the decision factor (e.g., level 3, level 10, expert, intermediate, beginner). The manager, via the GUI interface, associates agents to a level for one or more of the decision factors. The technology generates assignment configurations (e.g., plain text file to route contacts in a contact routing device, command line changes to route contacts in a contact routing device) for one or more contact routing devices based on the associations of the agents. The contact routing devices can utilize the assignment configurations to route contacts to agents based on the levels assigned to the agents for the one or more of the decision factors. The generation of assignment configurations for a variety of contact routing devices advantageously decreases the cost for maintaining the contact routing devices by decreasing the time required for installation and maintenance.

Figure 1:
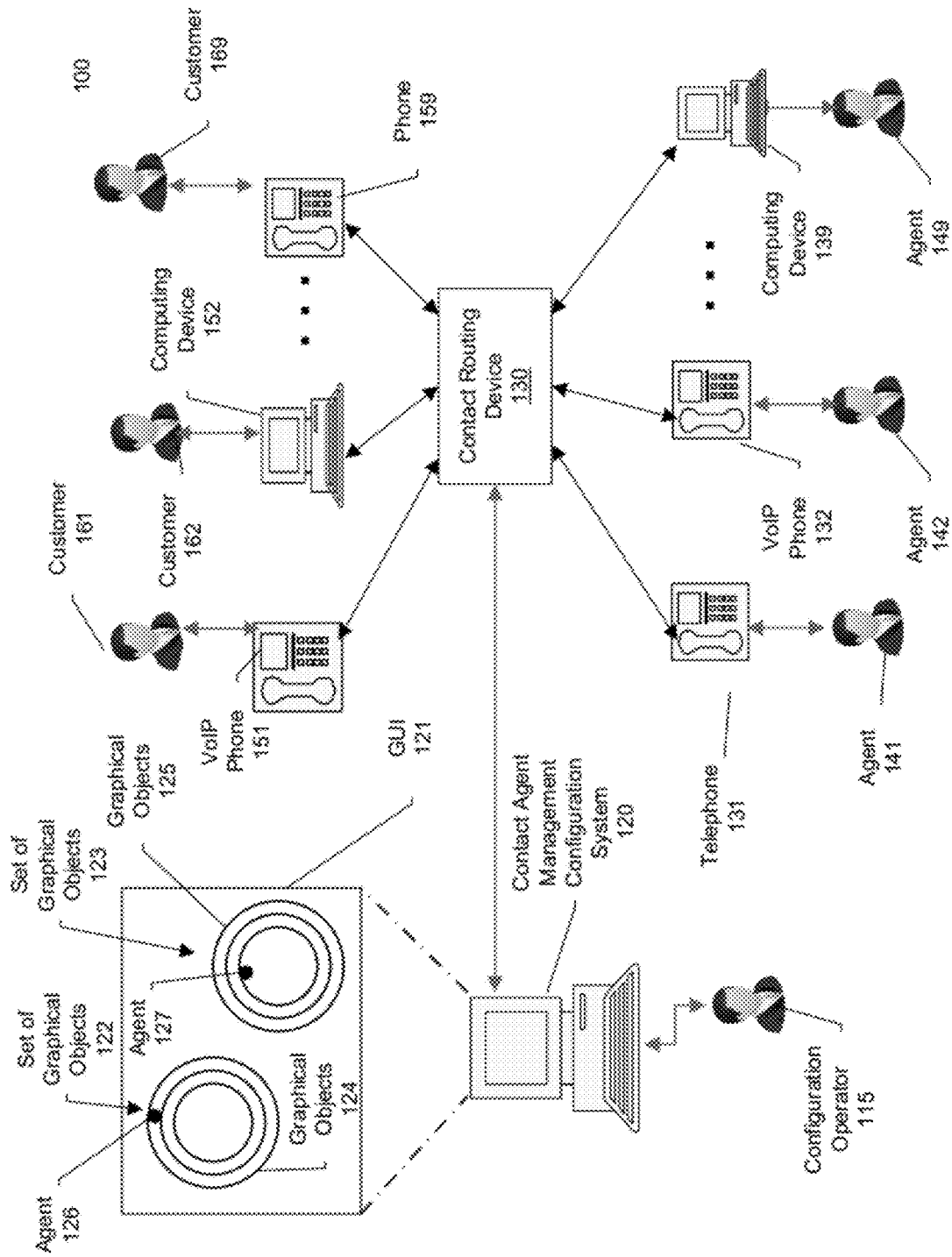
FIG. 1 is a diagram of an exemplary agent assignment environment.

FIG. 1 is a diagram of an exemplary agent assignment environment 100. The environment 100 includes a contact agent management configuration system 120, a contact routing device 130, a plurality of customer devices, a voice over internet protocol (VoIP) phone 151, a computing device 152 through a phone 159, and a plurality of agent devices, a telephone 131, a VoIP phone 132 through a computing device 139. Customers 161, 162 through 169 utilize the agent devices 151, 152 through 159, respectively, to interact with agents 141, 142 through 149 via the agent devices 131, 132 through 139, respectively. The contact routing device 130 routes contacts (e.g., call, email, text message) between the customer devices 151, 152 through 159 and the agent devices 131, 132 through 139 based on an assignment configuration (e.g., route calls for cable modems to the agent 141, route emails for cable modems to the agent 149, route calls for banking account questions to the agent 142).

A configuration operator 115 utilizes the contact agent management configuration system 120 to view and/or input information via a graphical user interface (GUI) 121. The GUI 121 illustrates agent assignments 126 and 127 in sets of graphical objects 122 and 123, respectively. The set of graphical objects 122 includes graphical objects 124. The set of graphical objects 123 includes graphical objects 125. The configuration operator 115 can associate the agents 126 and 127 with the sets of graphical objects 122 and/or 123. Each of the sets of graphical objects 122 and 123 correspond to a decision factor. Each of the graphical objects 124 and 125 in each set of graphical objects 122 and 123 correspond to a level of the decision factor. The graphical association of the agents advantageously decreases deployment time for new agents and agents with changed skill sets (e.g., proficiency increase from intermediate to expert, new skill), thereby decreasing the cost per customer contact.

Although FIG. 1 illustrates the sets of graphical objects 122 and 123 as concentric circles, the sets of graphical objects can be represented by any type of shape and/or shapes (e.g., stacked rectangles, inlaid triangles). Although FIG. 1 illustrates customers 161, 162 through 169, the contact routing device 130 can route contacts from any number (e.g., four hundred, ten thousand) and/or type of user (e.g., employee, client, contractor). Although FIG. 1 illustrates a single contact routing device 130, the contact agent management configuration system 120 can communicate with a plurality of contact routing devices (e.g., forty, two thousand). Although FIG. 1 illustrates a variety of customer devices, the contact routing device 130 can route contacts through any number (e.g., four hundred, twenty thousand) and/or type of customer device (e.g., personal computer, handheld computer, VoIP phone, network enabled television).

Figure 2:
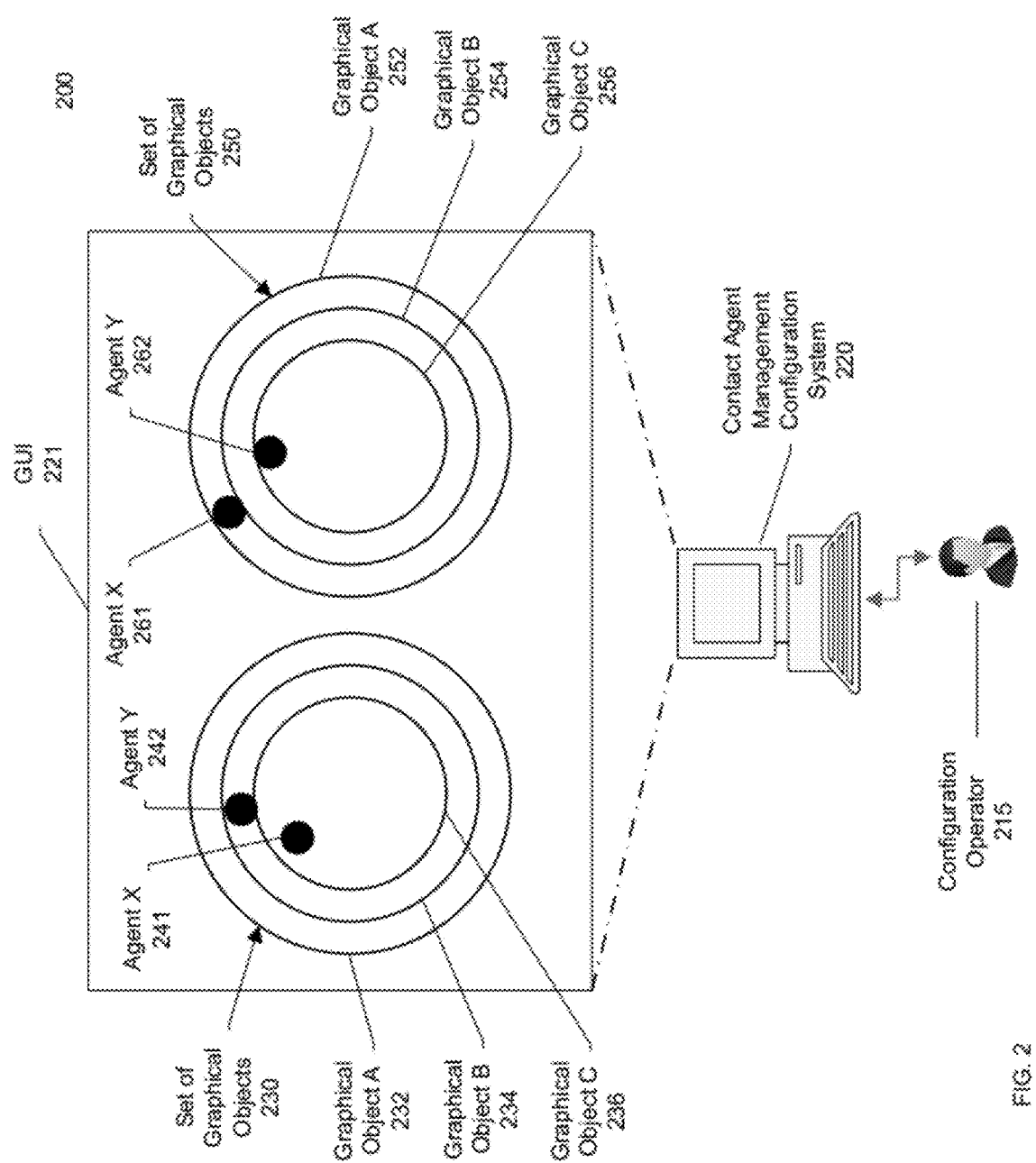
FIG. 2 is a diagram of an exemplary graphical user interface.

FIG. 2 is a diagram of an exemplary graphical user interface (GUI) 200. The GUI 200 is displayed via a contact agent management configuration system 220 (e.g., personal computer, handheld computer). A configuration operator 215 (e.g., contact center manager, human resource administrator) interfaces with the GUI 200 utilizing the contact agent management configuration system 220 (e.g., input via a touch screen interface, input via a mouse). The GUI 200 illustrates two sets of graphical objects 230 and 250 and each set of graphical objects 230 and 250 corresponds to a decision factor (e.g., time availability, resource availability). Each set of graphical objects 230 and 250 includes graphical objects. The set of graphical objects 230 includes graphical objects A 232, B 234, and C 236. The set of graphical objects 250 includes graphical objects A 252, B 254, and C 256. The graphical objects correspond to different levels within the decision factor (e.g., 4:00 pm to 6:00 pm, expert, all types). As illustrated in FIG. 2, in this embodiment, each set of graphical objects is a set of concentric inlaid circles. The GUI 200 provides a simplified representation of the decision factor and levels of the decision factor, thereby increasing the efficient use of resources (e.g., agent usage, computer usage).

The configuration operator 215 associates, via the contact agent management configuration system 220, the Agents X 241 and 261 and Y 242 and 262 with the respective graphical objects. The graphical association of agents with graphical objects advantageously decreases the time to configure a plurality of contact routing devices by graphically standardizing the configuration mechanism. In some examples, the agent representations in the GUI 200 can be automatically modified (e.g., different icon, highlighted) based on the status of the agent (e.g., on break, on call, logged in). The agent representations can be monitored by the contact agent management configuration system 220 for automatic modification (e.g., automatically based on whether the agent is logged in or not, automatically based on whether the agent is on a call or not). Table 1 illustrates exemplary decision factors and levels of decision factor that correspond to the illustrations in FIG. 2.

TABLE 1

Exemplary Decision Factors and Levels of Decision Factors

| Set of Graphical Objects | Decision Factor | Graphical Objects | Level |
|---|---|---|---|
| Set of Graphical Objects 230 | Foreign Language - German | | |
| | | A 232 | Expert |
| | | B 234 | Intermediate |
| | | C 236 | Beginner |
| Set of Graphical Objects 250 | Cable Box Support | | |
| | | A 252 | All Models |
| | | B 254 | All Model A Units |
| | | C 256 | Model A2 Units |

For example, in operation, the configuration operator 215, via the contact agent management configuration system 220, can modify the association of the Agent X 241 from graphical object C 236 to graphical object B 234 by graphically moving the Agent X 241 in the GUI 200. As another example, in operation, the configuration operator 215, via the contact agent management configuration system 220, can modify the association of the Agent Y 262 from graphical object C 256 to graphical object B 254 in the GUI 200. After a modification of an association of an agent, the contact agent management configuration system 220 can generate an assignment configuration (e.g., text document with routing rules, database queries) for a contact routing device. The assignment configuration can be utilized by the contact routing device to route contacts to the appropriate agent.

The assignment configuration advantageously increases agent satisfaction by routing appropriate contacts to the agents based on the agent's decision factors and level of the decision factors (e.g., agent is highly skilled in Spanish but not highly skilled in German, agent is third level referral for cable modem issues). For example, a contact (e.g., call, email) that requires an agent with intermediate German language skills is routed to the Agent Y's computing device (e.g., telephone, handheld computer). As another example, a contact (e.g., text message, voice message) that requires an agent with at least a beginner German language skills and Model A1 cable modem skills is routed to the Agent X's computing device (e.g., VoIP phone, personal computer).

The visual configuration of a plurality of contact routing devices removes the need for a configuration operator 215 to know multiple languages and/or configuration techniques. In other words, the configuration operator 215 can visually make changes to agent configurations and then click on an "Update All" button to automatically update assignment configurations for a plurality of heterogeneous contact routing devices. The visual configuration techniques described herein advantageously decrease the time and cost required to update contact routing devices by increasing the efficiency of the process.

Figure 3:
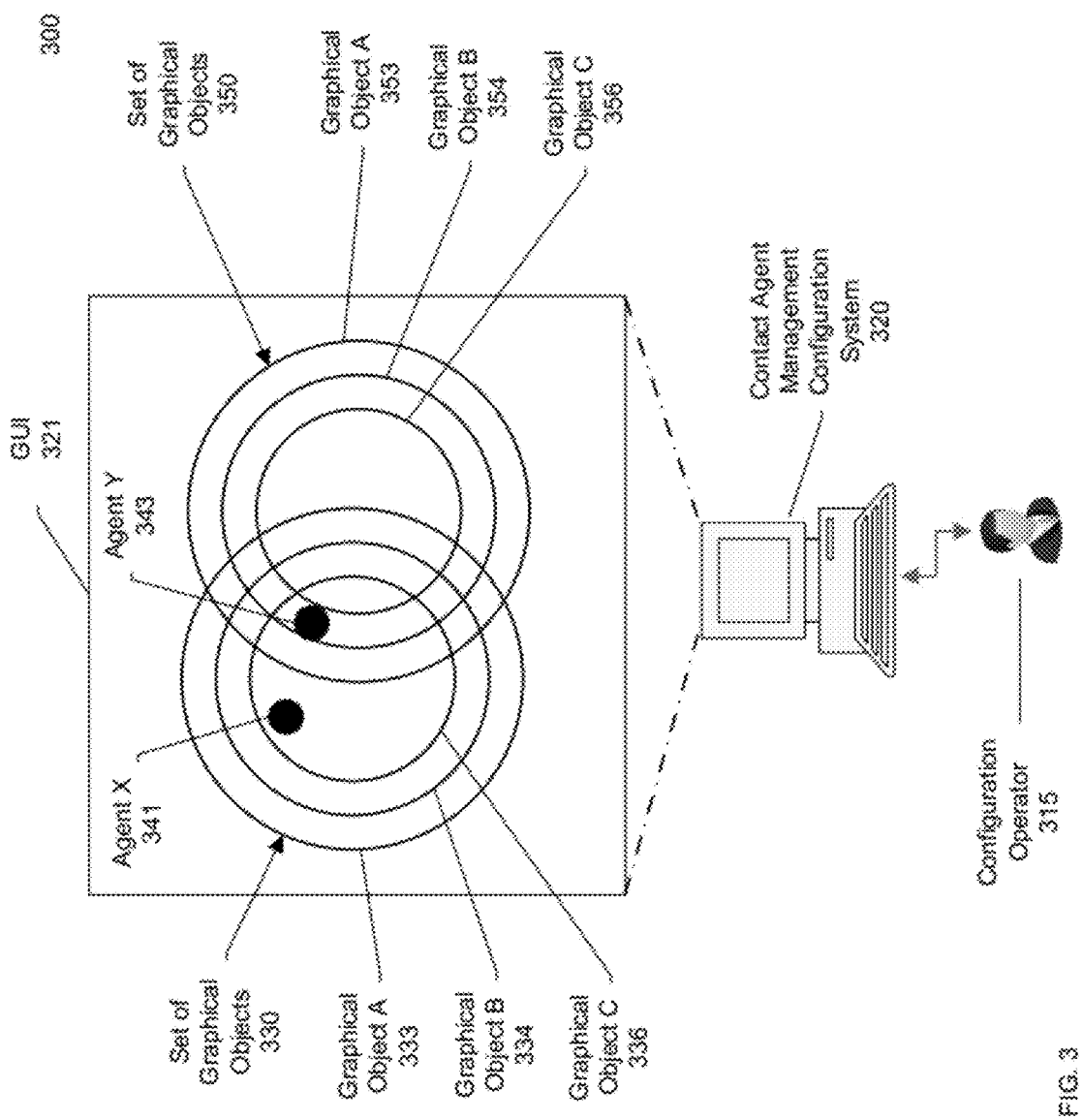
FIG. 3 is a diagram of another exemplary graphical user interface.

FIG. 3 is a diagram of another exemplary graphical user interface (GUI) 300. The GUI 300 is displayed via a contact agent management configuration system 320 (e.g., mobile phone, handheld computer). A configuration operator 315 (e.g., contact center administrator, department manager) interfaces with the GUI 300 utilizing the contact agent management configuration system 320 (e.g., input via a voice input interface, input via a keyboard). The GUI 300 illustrates two sets of graphical objects 330 and 350 and each set of graphical objects 330 and 350 corresponds to a decision factor (e.g., skill set, agent availability). Each set of graphical objects 330 and 350 includes graphical objects. The set of graphical objects 330 includes graphical objects A 332, B 334, and C 336. The set of graphical objects 350 includes graphical objects A 352, B 354, and C 356. The graphical objects correspond to different levels within the decision factor (e.g., 4:00 pm to 6:00 pm, expert, all types).

As illustrated in FIG. 3, in this embodiment, each set of graphical objects is a set of concentric inlaid circles and the sets of graphical objects 330 and 350 overlap. The overlapping of the sets of graphical objects 330 and 350 enables the configuration operator 315 to reduce the amount of input required to associate agents, Agents X 341 and Y 343, with the various decision factors, thereby decreasing the time needed to configure a contact routing device. The contact agent management configuration system 320 can determine (e.g., graphical identification, graphical analysis, array analysis) the overlapped sets of graphical objects 330 and 350. The contact agent management configuration system 320 modifies the assignment configuration or a part thereof (e.g., assignment list, agent associations) based on the overlapped sets of graphical objects. In this example, the contact agent management configuration system 320 can generate the assignment configuration (e.g., remote commands for execution, PBX configuration file) for a contact routing device and communicate the assignment configuration to the contact routing device (e.g., transfer via file transfer protocol (FTP), execute commands via a remote shell).

Figure 4:
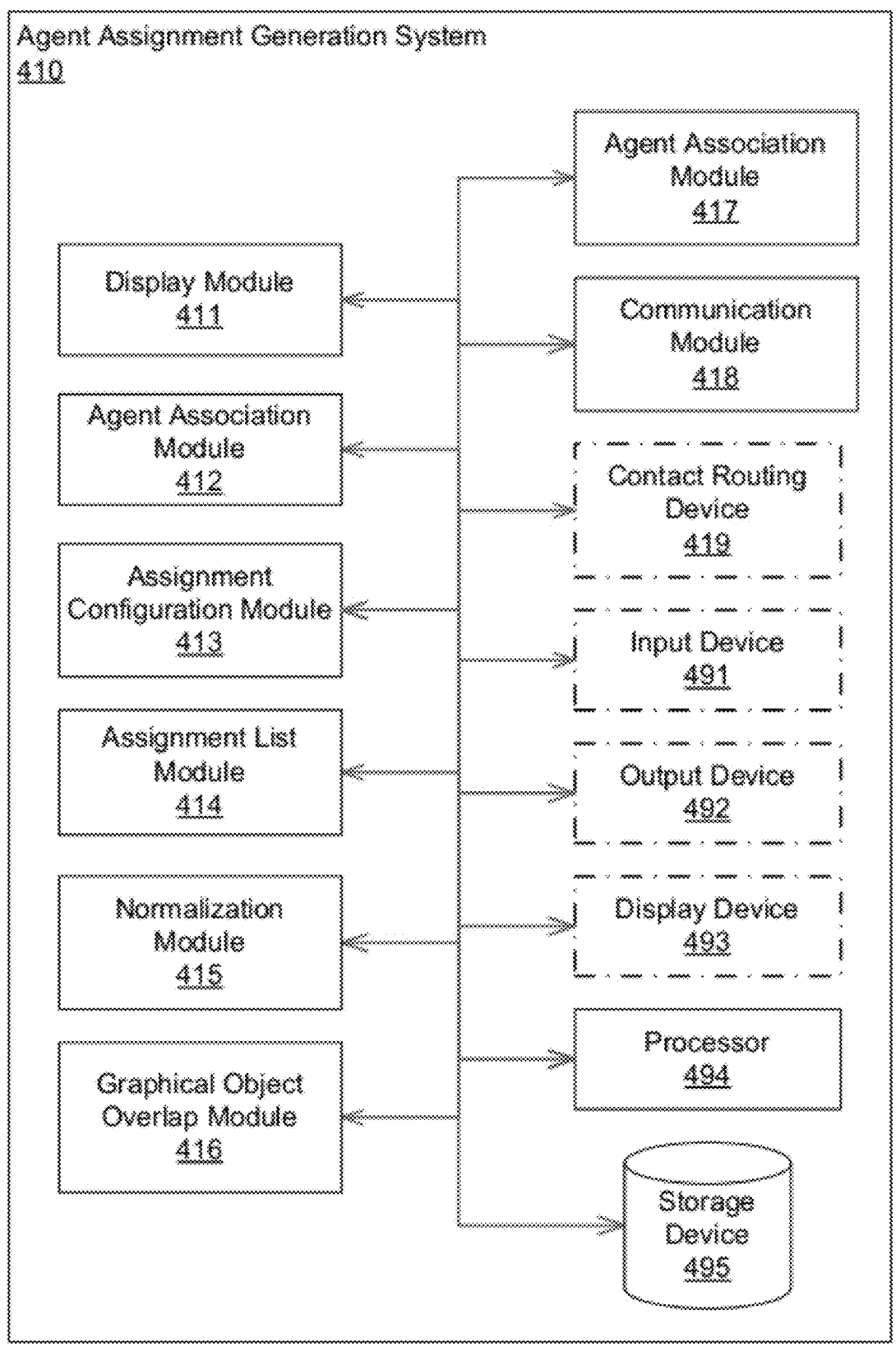
FIG. 4 is a diagram of an exemplary agent assignment generation system.

FIG. 4 is a diagram of an exemplary agent assignment generation system 410 (also referred to as a contact agent management configuration system). The agent assignment generation system 410 includes a display module 411, an agent association module 412, an assignment configuration module 413, an assignment list module 414, a graphical object overlap module 416, an agent association module 417, a communication module 418, a contact routing device 419, an input device 491, an output device 492, a display device 493, a processor 494, and a storage device 495. The contact routing device 419, the input device 491, the output device 492, and the display device 493 are optional components of the agent assignment generation system 410. The modules and devices described herein can, for example, utilize the processor 494 to execute computer executable instructions and/or the modules and devices described herein can, for example, include their own processor to execute computer executable instructions (e.g., an encryption processing unit, a field programmable gate array processing unit, etc.). It should be understood that the agent assignment generation system 410 can include, for example, other modules, devices, and/or processors known in the art and/or varieties of the illustrated modules, devices, and/or processors.

The display module 411 displays a graphical user interface (GUI) with one or more sets of graphical objects. The display module 411 displays the GUI via the display device 493 and/or any other display device (e.g., externally connected display device, remote display device). Each set of graphical objects corresponds to a decision factor and each graphical object in each set of graphical objects corresponding to a level of the decision factor. Table 2 illustrates exemplary graphical objects.

TABLE 2

Exemplary Graphical Objects

| Set of Graphical Objects | Decision Factor | Graphical Objects | Level |
|---|---|---|---|
| A | Foreign Language - Spanish | | |
| | | A1 | Expert |
| | | A2 | Intermediate |
| | | A3 | Beginner |
| B | Web Browser Support | | |
| | | B1 | All Browsers |
| | | B2 | Browser Alpha |
| | | B3 | Browser Beta |
| | | B4 | Browser Zeta |
| C | Advertisement Support | | |
| | | C1 | All Types |
| | | C2 | Retail Focused |
| | | C3 | Consumer Focused |

The agent association module 412 associates one or more agents with at least one set of graphical objects based on user input (e.g., input received from a touch screen, input received from another computing device, input received from a mouse, input from a voice system). The user input includes, for each of the one or more agents, an agent decision factor (e.g., time availability, technology expertise) and an agent level (e.g., expert, level 5, entry-level) for the agent decision factor. Table 3 illustrates exemplary associations between agents and graphical objects. As described in Table 3, each of the agents is associated with a graphical object based on user input. The association of the agents via the user input advantageously enables the technology to quickly and efficiently configure and/or re-configure contact routing devices for various applications (e.g., call center, email routing).

TABLE 3

Exemplary Associations

| User Input | Graphical Object | Agent |
|---|---|---|
| Movement of Agent Object into Graphical Object | A2 | Smith43 |
| Touch of Agent Object on Graphical Object | B4 | Smith 43 |
| Keyboard Input of Agent Identification in Graphical Object Input | D3 | Lee23 |
| Movement of Agent Object into Graphical Object | Z4 | Lee23 |
| Voice Input of Agent Identification in Graphical Object Input | A3 | Allen49 |

TABLE 3-continued

Exemplary Associations

| User Input | Graphical Object | Agent |
|---|---|---|
| Movement of Agent Object into Graphical Object | B2 | Allen49 |
| Movement of Agent Object into Graphical Object | C3 | Allen49 |

The assignment configuration module 413 generates an assignment configuration for a contact routing device based on the one or more sets of graphical objects and the associated one or more agents. The generation of the assignment configuration enables the graphical representation of the agent information (e.g., agent levels of various decision factors, agent routing data) to be converted into a format usable by the contact routing device. Table 4 illustrates an exemplary assignment configuration generated by the assignment configuration module 413 based on the information as described in Table 2-3 above. Although Table 4 illustrates one exemplary assignment configuration, the assignment configuration module 413 can generate any type of format and/or data structure (e.g., a plurality of tables with associations between the tables, a listing of all available assignments). The generation of the assignment configuration for the contact routing device advantageously enables the graphical interface to be device agnostic, thereby enabling the one or more sets of graphical objects and the associated one or more agents to be utilized for a plurality of devices and/or environments, which decreases the installation and/or upgrade costs for various devices.

TABLE 4

Assignment Configuration

| Assignment | Agent |
|---|---|
| If Foreign Language - Spanish = Intermediate and Web Browser Support = Browser Alpha, Route Contact to [Agent] | Smith43 |
| If Foreign Language - German = Beginner and Email Client Support = Expert, Route Contact to [Agent] | Lee23 |
| If Foreign Language - Spanish = Beginner, Web Browser Support = Browser Alpha, and Advertisement Support = Consumer Focused, Route Contact to [Agent] | Allen49 |

In some examples, the assignment configuration module 413 generates another assignment configuration for another contact routing device based on the plurality of sets of graphical objects and the associated one or more agents. The generation of additional assignment configurations for other contact routing devices enables the technology to be utilized for a variety of types and/or numbers of contact routing devices, which decreases the cost for deployment of the various contact routing devices. In some examples, the assignment configuration module 413 generates assignment configurations for a plurality of contact routing devices based on device rules (e.g., format required for a device, data required for a device, communication protocol for a device). For example, the assignment configuration module 413 generates assignment configuration Alpha for contact routing device type Alpha, assignment configuration Beta for contact routing device type Beta, and assignment configuration Zeta for contact routing device type Zeta. The assignment configuration module 413 generates the assignment configurations Alpha, Beta, and Zeta based on devices rules for each of the devices (e.g., contact routing device type Alpha requires plain text file, contact routing device type Beta requires file transfer protocol of a binary file).

The assignment list module 414 generates an assignment list for each combination of decision factor and level associated with the one or more agents. The assignment list can be utilized to define iterations of decision factor and level for each agent. The assignment list can be utilized for contact routing devices that need single line statements. The assignment list can be utilized to modify the formatting and/or content of the assignment configuration for a variety of contact routing devices. Table 5 illustrates an exemplary assignment list. The assignment list illustrated in Table 5 lists the iterations for each agent. For example, routing rules for a contact routing device only allow single if statements to be processed and the generated assignment list can be utilized as the single if statements for the contact routing device.

TABLE 5

Assignment List

| Assignments | Agent |
|---|---|
| Foreign Language - Spanish = Intermediate | Smith43 |
| Web Browser Support = Browser Alpha | Smith43 |
| Foreign Language - German = Beginner | Lee23 |
| Email Client Support = Expert | Lee23 |
| Foreign Language - Spanish = Beginner | Allen49 |
| Web Browser Support = Browser Alpha | Allen49 |
| Advertisement Support = Consumer Focused | Allen49 |

The normalization module 415 normalizes the assignment list based on configuration parameters (e.g., maximum number of levels, minimum number of levels) associated with the contact routing device. The normalization of the assignment list can standardize the formatting and/or content of the assignment list to an expected level based on the configuration parameters associated with the contact routing device. In other words, the normalization of the assignment list can convert the For example, a contact routing device only allows three levels for each decision factor. In this example, if the assignment list includes more than three levels for any decision factor, the assignment list is normalized down to three levels for all decision factors.

In some examples, the assignment configuration module 413 generates an assignment configuration for a contact routing device based on the one or more sets of graphical objects, the associated one or more agents, and the normalized assignment list. The generation of the assignment configuration utilizing the normalized assignment list enables the assignment configuration module 413 to standardize the assignment configuration based on specific requirements for the contact routing device, thereby increasing the available uses of the technology and lowering the cost of deployment of the agent assignments to a variety of contact routing devices.

The graphical object overlap module 416 determines if two or more of the sets of graphical objects overlap on the GUI. For example, the graphical object overlap module 416 maps the sets of graphical objects onto a two dimensional array and determines if there are any overlaps between the graphical objects based on the two dimensional array. As another example, the graphical object overlap module 416 utilizes graphical interface libraries to determine if an overlap occurs within the GUI. The graphical overlap module 416 modifies the assignment list based on the two or more of the sets of graphical objects and the determination of overlap. For example, if the overlap occurs between two graphical objects in different sets of graphical objects, the graphical overlap module 416 adds entries into the assignment list for both of the graphical objects for the associated agent.

The agent association module 417 revises associations of the one or more agents based on a second user input (e.g., input from a mouse, voice input). The agent association module 417 automatically updates the assignment configuration for the contact routing device based on the revised associations. The revising and the updating advantageously enables the technology to receive changes from managers with respect to agent decision factor and level changes and then automatically update the contact routing device with the updated information. For example, a call center manager updates an agent's skill level from intermediate to expert and the technology automatically updates the contact routing device with the revised assignment configuration to reflect this skill level change.

The communication module 418 communicates the assignment configuration to the contact routing device. The communication of the assignment configuration to the contact routing device can enable the contact routing device to operate based on the agent associations. The communication of the assignment configuration can include, for example, a file transfer protocol (FTP) transfer of a plain text file, an email message with a plain text file, a transfer of a binary file, and/or any other type of information transfer. The contact routing device routes customer contacts based on the assignment configuration.

The contact routing device 419 receives a contact via the contact routing device. The contact routing device 419 determines a contact decision factor and a contact level of the contact decision factor based on the contact. The contact routing device 419 selects one or more contact agents from the associated one or more agents based on the determined contact decision factor, the determined contact level of the contact decision factor, and the assignment configuration. The contact routing device 419 routes the contact to the selected one or more contact agents. Although FIG. 4 illustrates the contact routing device 419 as part of the agent assignment generation system 410, in some examples, the contact routing device 419 is a separate device from the system 410.

The input device 491 receives information associated with the agent assignment generation system 410 from a user (not shown) and/or another computing system (not shown). The input device 491 can include, for example, a keyboard, a scanner, etc. The output device 492 outputs information associated with the agent assignment generation system 410 (e.g., information to a printer (not shown), information to a speaker, etc.).

The display device 493 displays information associated with the agent assignment generation system 410 (e.g., status information, configuration information, graphical objects, etc.). The processor 494 executes the operating system and/or any other computer executable instructions for the agent assignment generation system 410 (e.g., executes applications, etc.).

The storage device 495 stores graphical object information and/or assignment configuration. The storage device 495 can include a plurality of storage devices and/or the agent assignment generation system 410 can include a plurality of storage devices (e.g., an assignment configuration storage device, an agent level data storage device, etc.). The storage device 495 can include, for example, long-term storage (e.g., a hard drive, a tape storage device, flash memory, etc.), short-term storage (e.g., a random access memory, a graphics memory, etc.), and/or any other type of computer readable storage.

Figure 5:
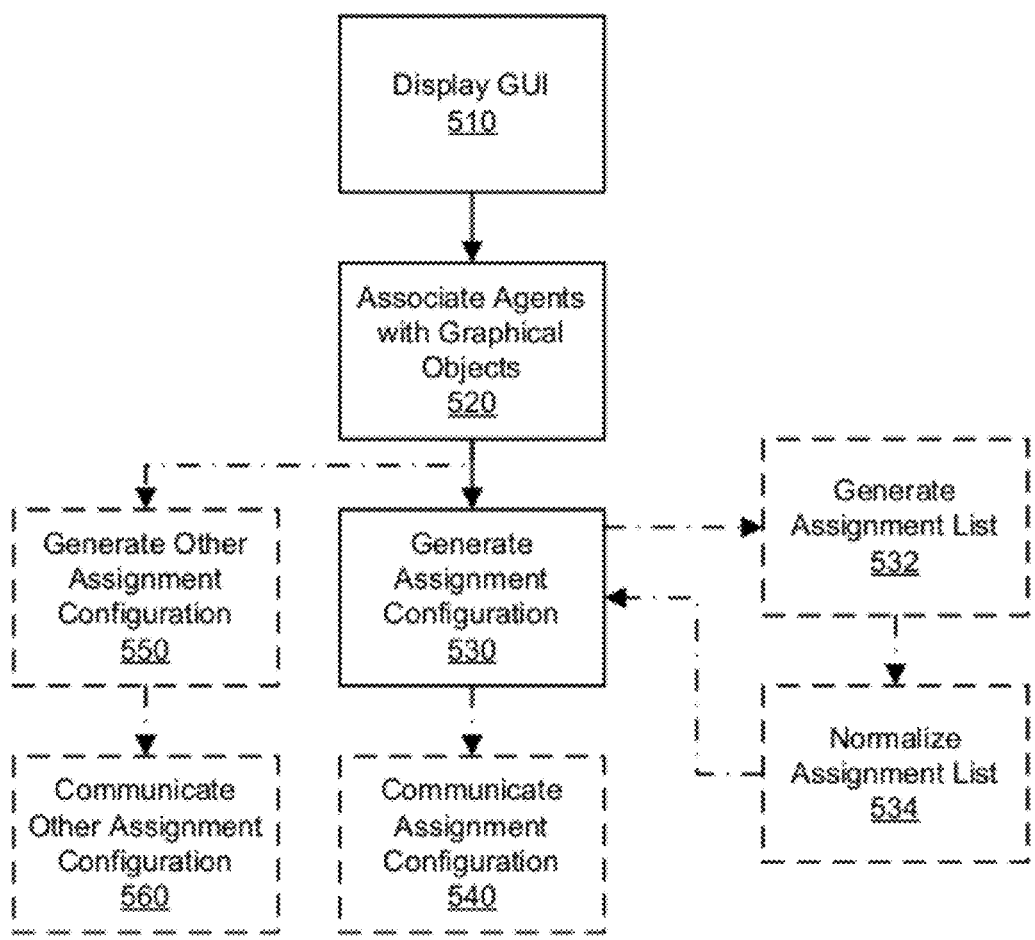
FIG. 5 is a flowchart of an exemplary agent assignment generation process.

FIG. 5 is a flowchart of an exemplary agent assignment generation process 500 utilizing, for example, the agent assignment generation system 410 of FIG. 4. The display module 411 displays (510) a graphical user interface (GUI) with one or more sets of graphical objects. Each set of graphical objects corresponds to a decision factor and each graphical object in each set of graphical objects corresponds to a level of the decision factor. The agent association module 412 associates (520) one or more agents with at least one set of graphical objects based on user input. The user input includes, for each of the one or more agents, an agent decision factor and an agent level for the agent decision factor. The assignment configuration module 413 generates (530) an assignment configuration for a contact routing device based on the one or more sets of graphical objects and the associated one or more agents.

In some examples, the assignment list module 414 generates (532) an assignment list for each combination of decision factor and level associated with the one or more agents. In some examples, the normalization module 415 normalizes (534) the assignment list based on configuration parameters associated with the contact routing device.

In some examples, the communication module 418 communicates (540) the assignment configuration to the contact routing device. The contact routing device routes customer contacts based on the assignment configuration. In some examples, the assignment configuration module 413 generates (530) the assignment configuration for a contact routing device based on the one or more sets of graphical objects, the associated one or more agents, and the normalized assignment list.

In some examples, the assignment configuration module 413 generates (550) a second assignment configuration for a second contact routing device based on the plurality of sets of graphical objects and the associated one or more agents. In some examples, the communication module 418 communicates (560) the second assignment configuration to the second contact routing device. The second contact routing device routes customer contacts based on the second assignment configuration.

Figure 6:
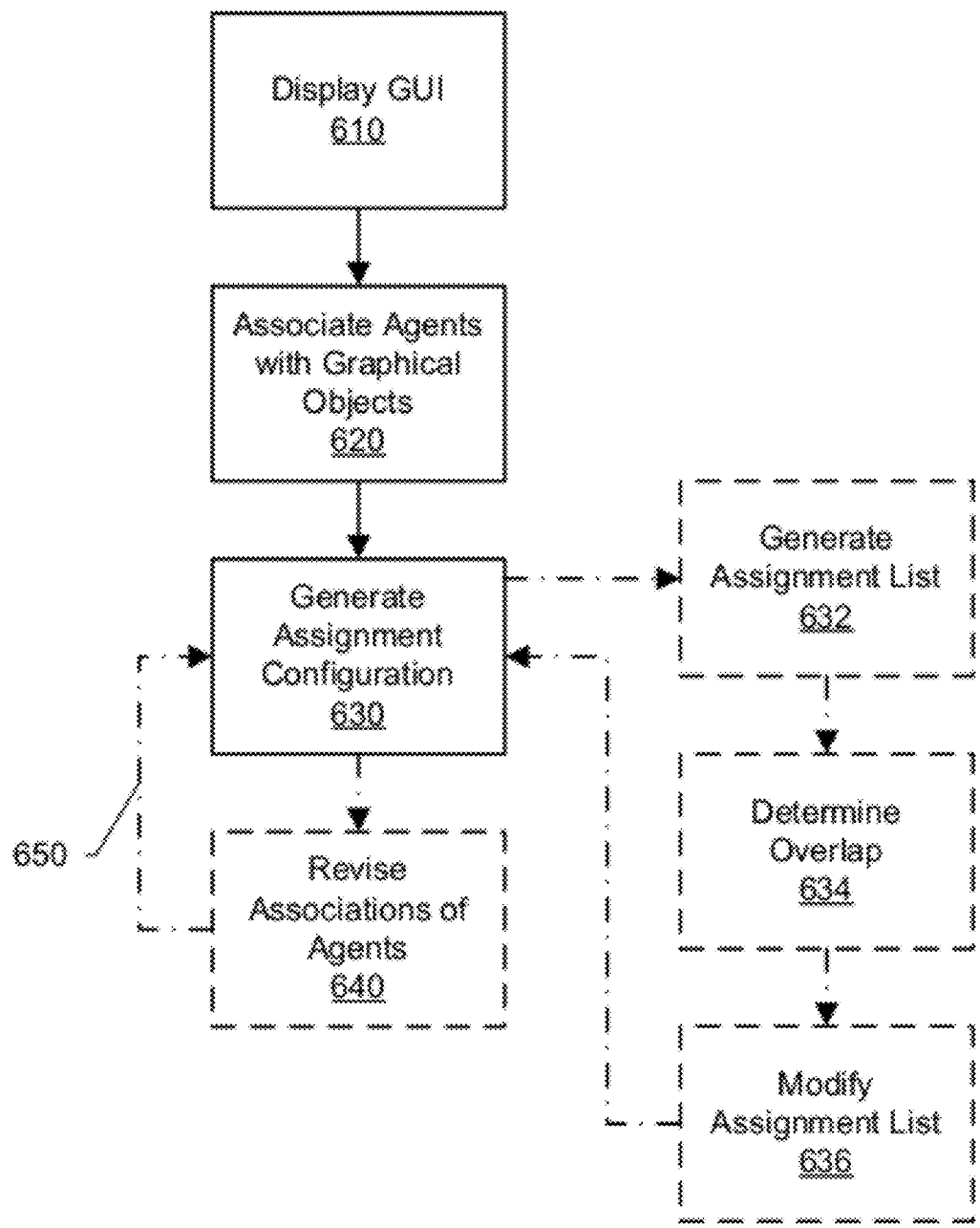
FIG. 6 is a flowchart of another exemplary agent assignment generation process.

FIG. 6 is a flowchart of another exemplary agent assignment generation process 600 utilizing, for example, the agent assignment generation system 410 of FIG. 4. The display module 411 displays (610) a graphical user interface (GUI) with one or more sets of graphical objects. Each set of graphical objects corresponds to a decision factor and each graphical object in each set of graphical objects corresponds to a level of the decision factor. The agent association module 412 associates (620) one or more agents with at least one set of graphical objects based on user input. The user input includes, for each of the one or more agents, an agent decision factor and an agent level for the agent decision factor. The assignment configuration module 413 generates (630) an assignment configuration for a contact routing device based on the one or more sets of graphical objects and the associated one or more agents.

In some examples, the assignment list module 414 generates (632) an assignment list for each combination of decision factor and level associated with the one or more agents. In some examples, the graphical object overlap module 416 determines (634) if two or more of the sets of graphical objects overlap on the GUI. In some examples, the graphical object overlap module 416 modifies (636) the assignment list based on the two or more of the sets of graphical objects and the determination of overlap.

In some examples, the agent association module 417 revises (640) associations of the one or more agents based on a second user input. In some examples, the assignment configuration module 413 automatically updates (650) the assignment configuration for the contact routing device based on the revised associations.

In some examples, each decision factor is associated with an agent skill and each level of the decision factor is associated with an agent level of the agent skill. In some examples, the agent level is a measure of an agent proficiency in the agent skill. In some examples, the assignment configuration includes a call routing script.

Figure 7:
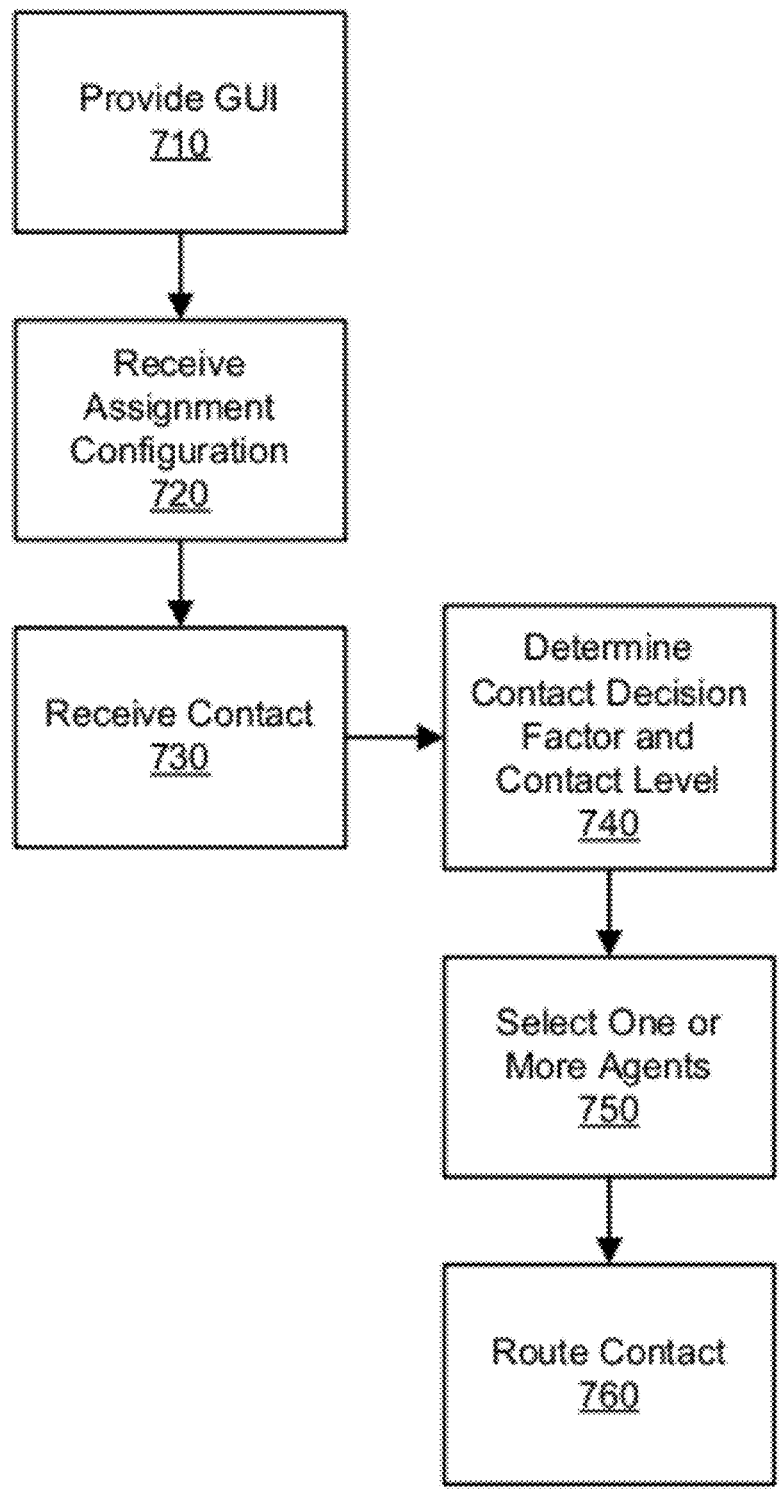
FIG. 7 is a flowchart of an exemplary contact routing process.

FIG. 7 is a flowchart of an exemplary contact routing process 700 utilizing, for example, the agent assignment generation system 410 of FIG. 4. The display module 411 provides (710) for display a graphical user interface (GUI) with one or more sets of graphical objects and one or more agents of the system. The contact routing device 419 receives (720) an assignment configuration and/or at least one association between an agent and a level of a decision factor of a graphical object. The assignment configuration is generated based on the one or more sets of graphical objects and associated one or more agents. The contact routing device 419 can store the assignment configuration.

The contact routing device 419 receives (730) a contact (e.g., an audio call, an e-mail message, a text message). The contact routing device 419 determines (740) a contact decision factor and a contact level of the contact decision factor based on the contact (e.g., expert phone support, intermediate computer support). The contact routing device selects (750) one or more contact agents from the associated one or more agents based on the determined contact decision factor, the determined contact level of the contact decision factor, and the assignment configuration (e.g., select agent with expert phone support, select four agents with intermediate computer support). The contact routing device routes (760) the contact to the selected one or more contact agents (e.g., routes contact to agent with expert phone support, routes to available agent with intermediate computer support).

In some examples, a set of graphical objects corresponds to a decision factor utilized by the contact center agent management system in routing contacts. In some examples, a graphical object in a set of graphical objects corresponds to a level of the decision factor. In some examples, the one or more agents are individuals to whom the contact center agent management system routes contacts.

In some examples, each decision factor is associated with an agent skill and each level of the decision factor is associated with an agent level of the agent skill. In some examples, the agent level is a measure of an agent proficiency in the agent skill. In some examples, the contact is an audio call, an e-mail message, a text message, or a video call.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the disclosure by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, provide feedback to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Google Chrome available from Google Inc., Mozilla® Firefox available from Mozilla Corporation). The mobile computing device includes, for example, a device utilizing an Android operating system.

Comprise, include, and/or plural forms of each are open-ended and include the listed parts and can include additional parts that are not listed. And/or is open-ended and includes one or more of the listed parts and combinations of the listed parts.

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

What is claimed is:

1. A method for configuring a contact center agent management system, the method comprising:
   providing for display of a graphical user interface (GUI), the GUI including 1) one or more sets of graphical objects and 2) one or more agents of the contact center agent management system, wherein:
      a set of graphical objects corresponds to a decision factor utilized by the contact center agent management system in routing contacts, wherein the set of graphical objects is a set of concentric inlaid objects;
      a concentric inlaid object in a set of graphical objects corresponds to a level of the decision factor; and
      the one or more agents are individuals to whom the contact center agent management system routes contacts;
   receiving, via the GUI, at least one association between one or more agents and a level of a decision factor of a graphical object;
   storing an assignment configuration for a contact routing device, the assignment configuration based on the at least one association;
   receiving, by the contact routing device, a contact;
   determining a contact decision factor and a contact level of the contact decision factor based on the contact;
   generating an assignment list for each combination of decision factor and level associated with the one or more agents, wherein the assignment list is a part of the assignment configuration;
   determining if two or more of the sets of graphical objects overlap on the GUI; and
   modifying the assignment list based on the two or more of the sets of graphical objects and the determination of overlap;
   selecting one or more contact agents from the associated one or more agents based on the determined contact decision factor, the determined contact level of the contact decision factor, and the assignment configuration; and
   routing the contact to the selected one or more contact agents.

2. The method of claim 1, wherein each decision factor is associated with an agent skill and each level of the decision factor is associated with an agent level of the agent skill.

3. The method of claim 2, wherein the agent level is a measure of an agent proficiency in the agent skill.

4. The method of claim 1, wherein the contact is an audio call, an e-mail message, a text message, or a video call.

5. The method of claim 1, further comprising normalizing the assignment list based on configuration parameters associated with the contact routing device.

6. The method of claim 5, further comprising generating an assignment configuration for a contact routing device based on the one or more sets of graphical objects, the associated one or more agents, and the normalized assignment list.

7. The method of claim 1, further comprising associating one or more agents with at least one set of graphical objects based on user input, the user input comprises, for each of the one or more agents, an agent decision factor and an agent level for the agent decision factor.

8. The method of claim 1, further comprising generating a second assignment configuration for a second contact routing device based on the plurality of sets of graphical objects and the associated one or more agents.

9. The method of claim 1, wherein each set of graphical objects is a set of concentric inlaid circles.

10. The method of claim 1, further comprising:
    revising associations of the associated one or more agents based on a second user input; and
    automatically updating the assignment configuration for the contact routing device based on the revised associations.

11. The method of claim 1, wherein the assignment configuration comprises a call routing script.

12. A contact center agent management system, the system comprising:
    one or more processors;
    a display module for displaying, via a display device, a graphical user interface (GUI) with one or more sets of graphical objects and one or more agents of the contact center agent management system, wherein each set of graphical objects is a set of concentric inlaid objects, wherein:
       each set of graphical objects corresponding to a decision factor utilized by the contact center agent management system in routing contacts, each concentric inlaid object in each set of graphical objects corresponding to a level of the decision factor, and the one or more agents are individuals to whom the contact center agent management system routes contacts;

an agent association module for associating, via the one or more processors, one or more agents with at least one set of graphical objects based on user input, the user input comprises, for each of the one or more agents, an agent decision factor and an agent level for the agent decision factor;

an assignment configuration module for generating, via the one or more processors, an assignment configuration for a contact routing device based on the one or more sets of graphical objects and the associated one or more agents;

an assignment list module for generating, via the one or more processors, an assignment list for each combination of decision factor and level associated with the one or more agents, wherein the assignment list is a part of the assignment configuration; and a graphical object overlap module for:
- determining, via the one or more processors, if two or more of the sets of graphical objects overlap on the GUI; and
- modifying, via the one or more processors, the assignment list based on the two or more of the sets of graphical objects and the determination of overlap.

13. The system of claim 12, further comprising:
the contact routing device configured to:
- receive a contact via the contact routing device;
- determine a contact decision factor and a contact level of the contact decision factor based on the contact;
- select one or more contact agents from the associated one or more agents based on the determined contact decision factor, the determined contact level of the contact decision factor, and the assignment configuration; and
- route the contact to the selected one or more contact agents.

14. The system of claim 12, further comprising a normalization module configured to normalize, via the one or more processors, the assignment list based on configuration parameters associated with the contact routing device.

15. The system of claim 14, further comprising the assignment configuration module further configured to generate, via the one or more processors, an assignment configuration for a contact routing device based on the one or more sets of graphical objects, the associated one or more agents, and the normalized assignment list.

16. The system of claim 12, further comprising the assignment configuration module further configured to generate, via the one or more processors, a second assignment configuration for a second contact routing device based on the plurality of sets of graphical objects and the associated one or more agents.

17. The system of claim 12, further comprising:
an agent association module configured to:
- revise, via the one or more processors, associations of the one or more agents based on a second user input; and
- automatically update, via the one or more processors, the assignment configuration for the contact routing device based on the revised associations.

18. The system of claim 12, further comprising a communication module configured to communicate, via the one or more processors, the assignment configuration to the contact routing device.

19. A computer program product, tangibly embodied in a non-transitory computer readable storage medium, the computer program product including instructions being operable to cause a data processing apparatus to:
display, via a display device, a graphical user interface (GUI) with one or more sets of graphical objects and one or more agents of the contact center agent management system, wherein each set of graphical objects is a set of concentric inlaid objects, wherein:
- each set of graphical objects corresponding to a decision factor utilized by the contact center agent management system in routing contacts,
- each concentric inlaid object in each set of graphical objects corresponding to a level of the decision factor, and
- the one or more agents are individuals to whom the contact center agent management system routes contacts;

associate one or more agents with at least one set of graphical objects based on user input, the user input comprises, for each of the one or more agents, an agent decision factor and an agent level for the agent decision factor;

generate an assignment configuration for a contact routing device based on the one or more sets of graphical objects and the associated one or more agents;

generate an assignment list for each combination of decision factor and level associated with the one or more agents, wherein the assignment list is a part of the assignment configuration; and determine if two or more of the sets of graphical objects overlap on the GUI; and modify the assignment list based on the two or more of the sets of graphical objects and the determination of overlap.

* * * * *